United States Patent
Schiesterl et al.

[15] 3,703,313
[45] Nov. 21, 1972

[54] SEAT, ESPECIALLY FOR MOTOR VEHICLES

[72] Inventors: Gerhard Schiesterl, Stuttgart; Helmut Wulf, Nellingen, both of Germany

[73] Assignee: Daimler-Benz Aktiengesellschaft, Stuttgart, Germany

[22] Filed: July 29, 1971

[21] Appl. No.: 167,217

[30] Foreign Application Priority Data

July 29, 1970 Germany..........P 20 37 565.9

[52] U.S. Cl.............297/391, 280/150 AB, 297/384, 297/395
[51] Int. Cl................................................A47c 7/36
[58] Field of Search......297/384, 388, 397, 390, 385, 297/395, 404; 280/150 SB, 150 AB, 150 B

[56] References Cited

UNITED STATES PATENTS

| | | | |
|---|---|---|---|
| 3,397,911 | 8/1968 | Brosius | 297/216 |
| 3,510,150 | 5/1970 | Wilfert | 297/391 |
| 3,525,535 | 8/1970 | Kobori | 297/395 |

FOREIGN PATENTS OR APPLICATIONS 6,615,335  5/1967  Netherlands........280/150 AB Primary Examiner—Bobby R. Gay
Assistant Examiner—Darrell Marquette
Attorney—Craig, Antonelli & Hill

[57] ABSTRACT

A seat, especially for motor vehicles, in which a gas cushion acting as headrest and automatically inflatable in case of an accident is arranged at the backrest of the seat; at least one belt is arranged behind the gas cushion for absorbing the rebound forces of the head of the passenger impinging against the gas cushion whereby the belt is arranged, on the one hand, within the area of the vehicle roof, and on the other, at the seat.

5 Claims, 2 Drawing Figures

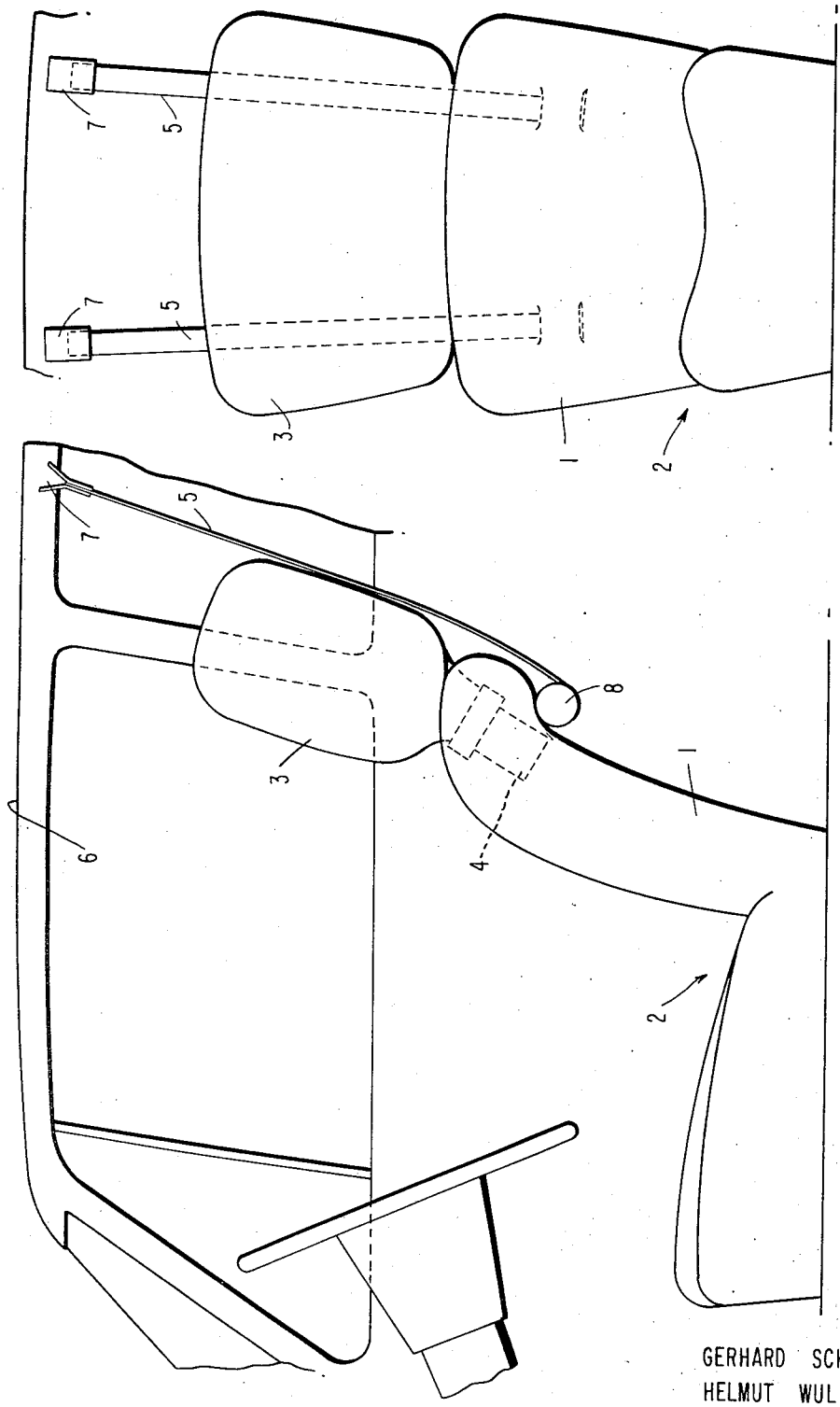
PATENTED NOV 21 1972                    3,703,313
INVENTORS
GERHARD SCHIESTERL
HELMUT WULF
BY Craig, Antonelli & Hill
ATTORNEYS

SEAT, ESPECIALLY FOR MOTOR VEHICLES

The present invention relates to a seat intended especially for motor vehicles, at the backrest of which is arranged a gas cushion adapted to be automatically inflated in case of an accident and acting as headrest.

Gas cushions acting as headrests have already been proposed heretofore because they are accommodated in folded-together condition during the normal driving operation, for example, in the backrest of the seat and thus do not unfavorably influence in any manner the freedom of movement of the vehicle passengers and their visibility conditions which is by no means always the case with the headrests customarily heretofore.

However, it has involved difficulties heretofore to so arrange such types of gas cushions that they can absorb completely satisfactorily the rebound or reaction force of a passenger head impinging thereon in case of an accident.

For avoiding these difficulties, a seat, especially for motor vehicles, is therefore proposed, at the backrest of which is arranged a gas cushion automatically inflatable in case of an accident and acting as headrest, whereby according to the present invention at least one belt or strap is arranged behind the gas cushion for absorbing the rebound or reaction force of the head acting on the gas cushion, which belt or strap is secured, on the one hand, within the area of the vehicle roof and, on the other, at the seat.

With seats adjustable in the longitudinal direction or in the height thereof, it is of advantage if one of the two securing places of the belt is constructed as automatic winding or reeling mechanism as is already known in connection with the customary safety seat belts because it is then assured that also upon adjustment of the seat, the belt has the necessary tension.

Accordingly, it is an object of the present invention to provide a seat, especially for motor vehicles, which avoids the aforementioned shortcomings and drawbacks encountered in the prior art.

Another object of the present invention resides in a seat, especially for passenger motor vehicles, in which the backrest is equipped with an automatically inflatable gas cushion, which, upon inflation, is capable of absorbing completely satisfactorily all rebound forces impinging thereon.

A further object of the present invention resides in a seat equipped with an inflatable headrest which assures adequate tension in the support belt supporting the same in the longitudinal direction.

These and further objects, features, and advantages of the present invention will become more apparent from the following description when taken in connection with the accompanying drawing which shows, for purposes of illustration only, one embodiment in accordance with the present invention, and wherein:

FIG. 1 is a somewhat schematic side elevational view of a motor vehicle seat equipped according to the present invention; and FIG. 2 is a front elevational view of the seat of FIG. 1.

Referring now to the drawing wherein like reference numerals are used throughout the two views to designate like parts, an inflatable gas cushion 3 is arranged at the backrest 1 of the illustrated seat generally designated by reference numeral 2 of a motor vehicle. The gas cushion 3 is disposed during the normal driving operation in a container 4 provided in the backrest 1 of the seat 2. Two belts 5 are provided for the support of the gas cushion 3 which, on the one hand, are secured by any conventional means within the area of the roof 6 of the vehicle at 7 and, on the other, at the backrest 1 of the seat 2. The securing the belts 5 at the backrest 1 is thereby constructed as automatic winding or reeling mechanism 8, known as such in the prior art and therefore not illustrated in detail herein.

The filling of the gas cushion takes place in a known manner in dependence of a deceleration switch (not shown) which upon exceeding a predetermined deceleration of the vehicle, permits compressed gas to flow into the gas cushion 3. Since such switches and controls are known as such and form no part of the present invention, a detailed description thereof is dispensed with herein.

The proposed belts 5, in addition to their function properly speaking, also represent an additional protection for the vehicle passengers seated therebehind in that they act in case of an accident practically as catching means operable to catch and stop forward thrown passengers.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim

1. The combination comprising: a seat, especially for motor vehicles; a gas cushion means arranged at the backrest of the seat, said gas cushion means being automatically inflatable to form a headrest in the event of an accident; and at least one belt means arranged behind the gas cushion means for the absorption of the rebound force of the head of a passenger impinging against the gas cushion means, said belt means being secured within the area of the vehicle roof and within the area of the seat.

2. The combination according to claim 1, characterized in that one of the securing places of the belt means includes an automatic winding mechanism to maintain the tension of the belt means.

3. The combination according to claim 2, characterized in that the belt means is connected to the backrest and in that the connection of the belt means at the backrest includes the automatic winding mechanism.

4. The combination according to claim 1, characterized in that two belt means are provided to the rear of said gas cushion means.

5. The combination according to claim 1, characterized in that two belt means are provided to the rear of said gas cushion means.

* * * * *